Jan. 10, 1933.  C. H. ROBERTS  1,893,654
HYDRAULIC VARIABLE SPEED CONTROL
Filed Jan. 15, 1930
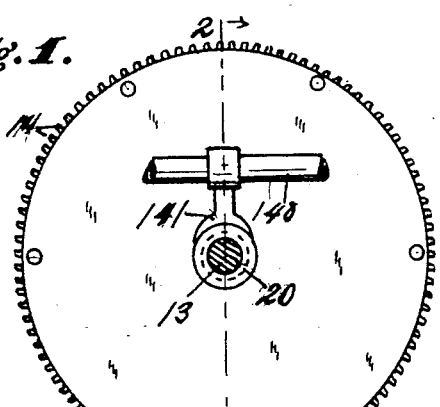
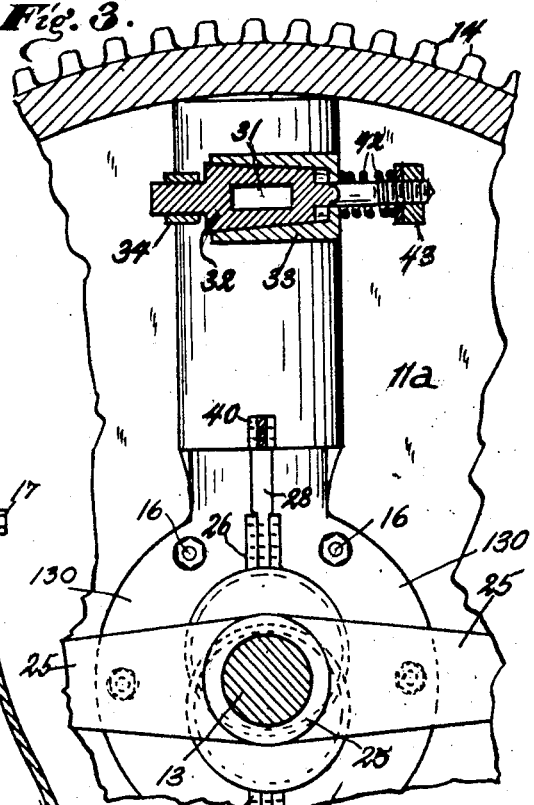
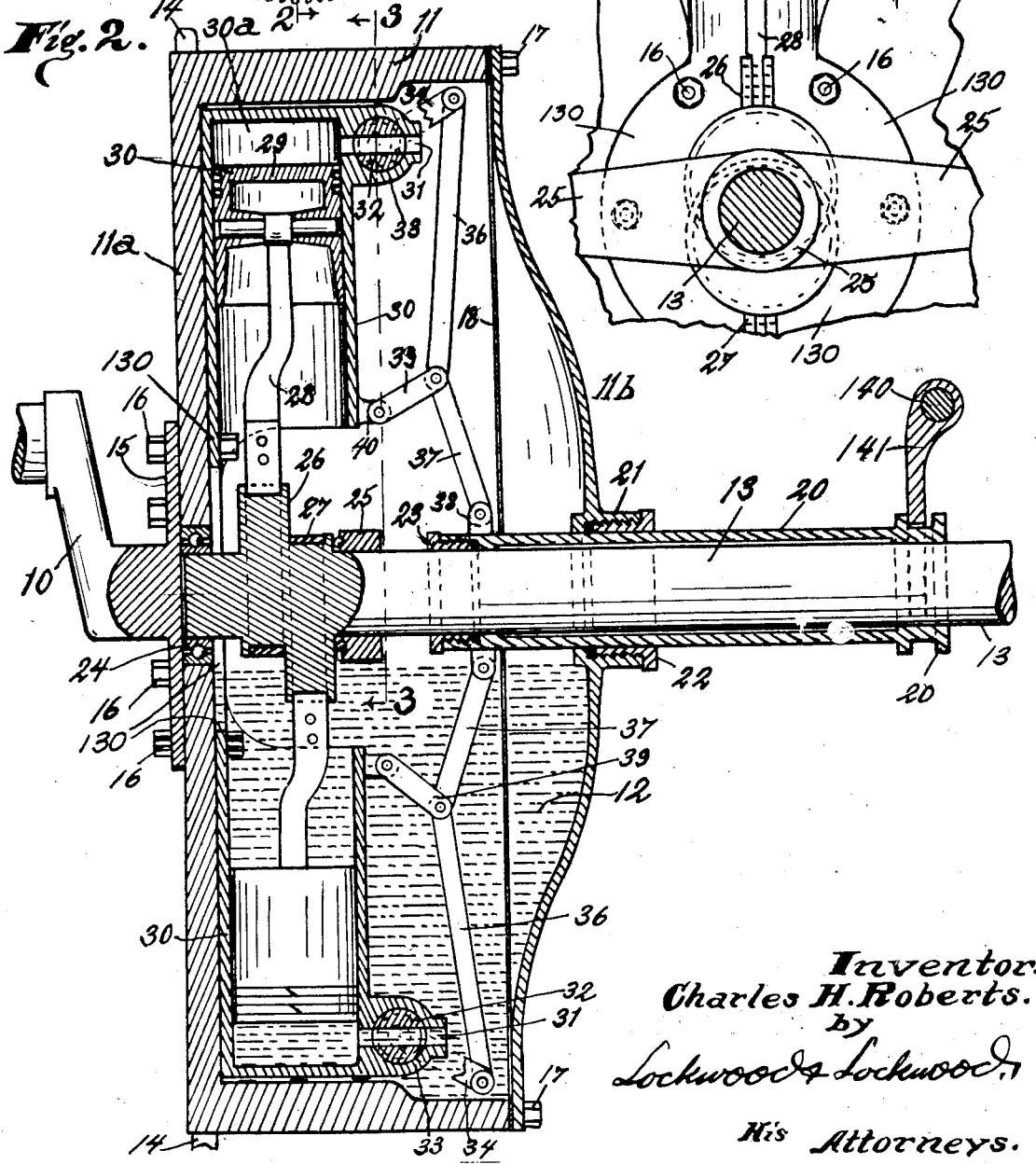
Inventor.
Charles H. Roberts.
by
Lockwood & Lockwood,
His Attorneys.

Patented Jan. 10, 1933

1,893,654

UNITED STATES PATENT OFFICE

CHARLES H. ROBERTS, OF PHOENIX, ARIZONA, ASSIGNOR OF ONE-HALF TO DELLA MAE MORRIS, OF LOS ANGELES, CALIFORNIA

HYDRAULIC VARIABLE SPEED CONTROL

Application filed January 15, 1930. Serial No. 420,997.

The object of this invention is to simplify greatly, both in construction and operation, means for transmitting power from the crank shaft of a gas engine or other driving member to a driven shaft through controlled hydraulic means which readily enables the driven shaft to be operated at any variable speed, or stopped or locked for high speed, as desired.

This mechanism is a simple and single means as a substitute for the complicated clutch and change speed gearing used in automobiles and the like. It connects or disconnects the driven shaft from the driving shaft and enables the slightest variation in speed to be employed, and thus is superior to the change speed mechanism heretofore employed which has been limited to two, three or four speeds. Furthermore, since it is hydraulic, the mechanism is freed from the positive, jerking or breaking movement of the old type of mechanism employed for this purpose.

In other words the hydraulic variable speed control both clutches the driving and driven shafts together and changes the speed to any desired degree, and this change may be as gradual as desired so that the mechanism will not be subjected to any shocks or undue strains.

The full nature of the invention will be understood from the accompanying drawing and the following description and claims:

In the drawing, Fig. 1 is an elevation of the right hand side of the device as shown in Fig. 2. Fig. 2 is an enlarged substantially central section of the mechanism on the line 2—2 of Fig. 1. Fig. 3 is a transverse section of a part of the mechanism on the line 3—3 of Fig. 2.

There is shown herein means for illustrating the general nature of this invention that is adapted for transmission means in automobiles and the like. There is a crank shaft 10, a hollow driving housing 11 to contain oil or other fluid 12, and a driven shaft 13 which extends centrally into said housing and coaxially with the driving shaft. In automobiles the driven shaft 13 transmits power to the rear axle, not shown. In the form shown the fly-wheel 11a of the engine constitutes one side of the housing 11, and it has teeth 14 employed for starting the engine. The driving shaft 10 has an integral plate 15 which is secured by bolts 16 to the fly-wheel 11a of housing 11, as shown. Therefore, the housing serves as a flywheel and rotates with the driving shaft.

On the rear side of the housing 11 is a plate 11b secured by bolts 17 and a packing ring 18, so as to be fluid-tight. The driven shaft 13 operates in and carries a sleeve 20 that extends through the threaded extension 21 of the side 11b of the housing 11, and is held therein by a ring nut 22. The inner end of said sleeve 20 is internally threaded to receive a similar ring nut 23.

Suitable packing is provided whereby no fluid can escape from the housing along said sleeve 20. The extreme inner end of shaft 13 is mounted in a ball-bearing 24 in the housing or fly-wheel 11a and the driven shaft and housing are held from relative lateral movement by a cross bar 25 which at its ends is secured to the cylindrical wall of the housing 11 and the thrust bearing ring at the middle is adjacent to one of the eccentrics 26, as shown.

The driven shaft has near its inner end a pair of oppositely extending eccentrics, preferably integral therewith, each surrounded by a strap 27 that is secured to a piston rod 28 of the piston 29. The pistons operate in cylinders 30 which are integral with a connecting plate 130 secured in the housing 11 and preferably to the fly-wheel side 11a thereof by the bolts 16.

The pair of pistons are held in true radial alignment with the cylinders by the cross bar 25 and the driving shaft 10 as shown. The pair of pistons simultaneously move radially outward and inward and transmit the rotary movement of the housing 11 to the driven shaft 13 when the movement of the pistons is resisted by the oil or fluid 12.

The device is arranged so that the pistons do not reach the outer ends of the cylinders but leave a fluid chamber 30a therein which communicates through the reduced conduit 31 with a chamber in the housing 11 and it is controlled by a valve 32. The valve may be made as shown in Fig. 3 tapering in form and fitting in a valve housing 33. The valves 32 are turned on and off by reciprocation of the sleeve 20 through the toggle connecting bars 36 and 37.

The bars 37 are pivoted to ears 38 on the sleeve 20 and the adjacent ends of the bars 36 and 37 are connected by links 39 with ears 40 on the cylinders 30. The arrangement is such that when the sleeve 20 is forced inward the valves are simultaneously opened and when it is moved outward they are moved to a closed or partially closed position. This movement is effected through the rod 140 and crank 141 secured thereto which is bifurcated and projects into the annular groove in the outer end of the sleeve 20.

The valves 32 are held in their seats by springs 42 as shown in Fig. 3, and these springs are held under tension by the nuts 43.

It is obvious from the foregoing description of the construction that after the engine is started and the housing 11 is rotated, and the valves are open, no power will be transmitted to the shaft 13 for propelling the automobile.

In use the housing 11 is nearly half filled with oil or other fluid, as shown in Fig. 2. When the engine is started and the housing 11 rotates, the fluid 12 is centrifugally driven out away from the center to the periphery of the chamber, and therefore the chambers 30a in the outer ends of the cylinders are full of oil as well as the passageways 31 through the valves.

If the parts are as shown in Fig. 2, when the oil is at the periphery after the engine has been started, no appreciable power will be transmitted from the driving shaft or housing to the driven shaft 13.

To start the automobile the operator slightly turns the rod 140 so as to move the sleeve 20 outward or rearward and partially close the passageways 31 from the chamber in the housing to the outer ends of the cylinders. As the resistance to the escape of the oil from the cylinders into the housing chamber increases by the closing movement of the valves, power will be transmitted through the pistons to the shaft 13 and it will start slowly. As the valves are further moved the speed of the shaft 13 will increase until the valves are entirely closed, and then the shaft 13 will operate at high speed.

By a slow movement of the valves the speed may be very gradually increased or diminished and any speed below high speed may be attained by partially closing the valves and leaving them set. Thus the valves can be adjusted readily to attain any desired speed and the same is not limited to two or three or four speed changes.

While the invention is shown in connection with use for driving an automobile, it is not limited to any particular use as it is capable of use in many situations besides automobiles.

By "driving member" in the claims is meant the housing 11 having a chamber in it, and it may or may not have the flywheel 11a as a part or be secured to a crank shaft so long as it is rotatable by power to drive the driven shaft 13.

The invention claimed is:

1. Hydraulic variable speed control including a drive shaft, a driven shaft, a rotary fluid-tight housing in which the driven shaft extends and is mounted coaxially, a chamber in said housing integral radially disposed cylinders detachably secured in and to said housing with chambers in their outer ends communicating with the chamber in said housing, pistons in said cylinders, eccentrics on the driven shaft, eccentric straps, piston rods connecting said straps and pistons, rotary valves for controlling the communication between the chamber of the housing and the chambers in the outer ends of the cylinders, a sleeve slidable on said driven shaft and having its inner end extending into the housing, external means for moving said sleeve, a crank on each valve and toggle bars pivotally mounted on said cylinders and connecting said cranks with said sleeve which open the valves when the sleeve is moved in one direction and close the same when it is moved in the opposite direction.

2. Hydraulic variable speed control including a drive shaft, a driven shaft, a rotary fluid-tight housing in which the driven shaft extends and is mounted coaxially with the drive shaft, a chamber in said housing radially disposed cylinders, a connecting plate integral with said cylinders that is secured in and to said housing said cylinders having chambers in their outer ends communicating with the chamber in said housing, eccentrics on the driven shaft, pistons in said cylinders, piston rods and eccentric straps connecting said pistons and eccentrics, valve housings integral with the outer end of said cylinders with passages from the chambers in said cylinders to the chamber in the housing, rotary valves in the valve housings for controlling said passages, a crank secured to each valve, a sleeve slidable on the driven shaft and extending into said housing and externally operable, a thrust bearing for resisting endwise movement of said driven shaft when said sleeve is actuated, toggle bars connecting the sleeve with the crank of each valve, and pivotal links connected between said toggle bars and said cylinders.

In witness whereof, I have hereunto affixed my signature.

CHARLES H. ROBERTS.